(12) United States Patent
Micklavzina (10) Patent No.: US 9,038,028 B1
(45) Date of Patent: May 19, 2015

(54) DYNAMIC CREATION AND USE OF SOFTWARE TESTING STUBS

(75) Inventor: Charles L. Micklavzina, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 653 days.

(21) Appl. No.: 13/421,415

(22) Filed: Mar. 15, 2012

(51) Int. Cl.
*G06F 9/44* (2006.01)
*G06F 11/20* (2006.01)

(52) U.S. Cl.
CPC ...................................... *G06F 11/20* (2013.01)

(58) Field of Classification Search
USPC .................. 717/124, 125, 126, 127
See application file for complete search history.

(56) References Cited

U.S. PATENT DOCUMENTS

| 4,438,298 A | * | 3/1984 | Rubin | 379/29.01 |
| 8,205,191 B1 | * | 6/2012 | Kolawa et al. | 717/124 |
| 2009/0327153 A1 | * | 12/2009 | Milne | 705/36 R |
| 2010/0306590 A1 | * | 12/2010 | Anand et al. | 714/32 |

* cited by examiner

*Primary Examiner* — Jue Louie
*Assistant Examiner* — Jae Jeon (57) ABSTRACT

A software testing tool providing dynamic testing stubs. The tool comprises, comprising a processor, a non-transitory memory coupled to the processor, and an application stored in the memory. When executed by the processor in a single execution session, the application receives a definition of a test stub as a mapping from a stub handle to a reply message content, stores the test stub in a data store as an entry comprising the stub handle and the reply content, receives an invocation of an application programming interface, where the invocation comprises an argument, searches the data store for a test stub having a stub handle that matches at least in part to the argument received in the invocation of the application programming interface, and transmits a reply message defined by the test stub.

13 Claims, 4 Drawing Sheets

DYNAMIC CREATION AND USE OF SOFTWARE TESTING STUBS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer software often interacts with a variety of other software. For example, a first software component relies upon a second software component to perform services for it and may send a request to the second software component including parameters that are to be processed or may otherwise provide instructions to the second software component. The second software component may complete the requested processing and return a message with results to the first software component. Testing a software component or application, for example when the component or application is first developed or is later modified, typically involves performing a plurality of representative activities of the software component or application. This may be referred to as exercising the software, executing the software, or testing the software. The separate scenarios of execution may be referred to as test cases.

It may be desirable in some stages of software testing, for example when the software under test is not yet ready for deployment to a production environment and/or when the supporting second software component is not yet ready for deployment to the production environment, to substitute a dummy or simulated interface in the place of the second software component or the support software. This substitute interface may define a number of different loop-back actions or testing stubs, such that when a request for service is sent by the software under test, an appropriate loop-back action or testing stub is selected and returned to the software under test: for example, a plausible response in the appropriate response message format is returned to the software under test. This stubbing practice, well known to those skilled in the software development art, promotes testing of in-progress software.

SUMMARY

In an embodiment, a software testing tool providing dynamic testing stubs is disclosed. The tool comprises a processor, a non-transitory memory coupled to the processor, and an application stored in the memory. When executed by the processor in a single execution session, the application receives a definition of a test stub as a mapping from a stub handle to a reply message content, stores the test stub in a data store as an entry comprising the stub handle and the reply content, receives an invocation of an application programming interface, where the invocation comprises an argument, searches the data store for a test stub having a stub handle that matches at least in part to the argument received in the invocation of the application programming interface, and transmits a reply message defined by the test stub.

In an embodiment, a method of software testing is disclosed. In an embodiment, the method comprises receiving a definition of a software test stub, the definition comprising a stub handle, storing the test stub in a data store, receiving a request to execute a function of an application programming interface (API) from an application under test, wherein the request comprises at least one argument, searching the data store based on the at least one argument, and, when the at least one argument comprises the stub handle, returning the test stub to the application under test. In an embodiment, each of the steps of the method may be performed in a single execution session of a software testing tool.

In an embodiment, a method of software testing is disclosed. The method comprises receiving a request message directed to an application programming interface (API) from an application under test, searching a data store based on the request message, wherein the data store comprises a plurality of software test stubs, when the search of the data store does not access a software test stub that has a stub handle that matches a sub-string of the request message, formatting a second request message based in part on the request message that contains information not present in the request message, and transmitting the second request message to a static software stubbing application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

While engaged in testing software components and/or applications, software developers and/or testers may identify new test cases that they would like to apply to testing a software component and/or software application at that time. It may be that immersion in the testing activity stimulates the tester to think of useful test cases he or she had not thought of before. It may be that the behavior of the software component and/or the software application elicited by other test cases suggests useful additional test cases that it is desired to execute at that time, while the subject software behavior is fresh in mind. A static software test environment, for example a statically structured and/or defined software test stubbing tool, may not promote such flexible and opportunistic testing procedures.

The present disclosure teaches a dynamic software stubbing tool that promotes on-the-fly definition and/or creation of testing stubs which support such adaptive, efficient software testing. After a test stub has been defined, it is nearly immediately available for use in testing. The dynamic software stubbing tool contemplated by the present disclosure provides an intuitive, user friendly interface that a tester or developer can use with minimal time investment in learning to use the dynamic software stubbing tool. This characteristic makes it possible for software developers and/or testers to create their own software test stubs without having to hire an expensive specialist, for example a contractor associated with a vendor of the static software stubbing tool.

In an embodiment, the dynamic software stubbing tool provides a graphical user interface that guides the user through the steps of defining a test stub. The tool promotes defining a class of application programming interface that is targeted by the test request, for example a hypertext markup language transport protocol (HTTP) request or a message queue manager request. The tool promotes the user designating a portion of an application programming interface request or function call argument list as a stub handle to associate with the new stub. Before creating the stub in a data store, the tool first confirms that the stub handle is unique in the data store. If unique, the stub is saved into the data store and is then available for use during testing. In some contexts, the stubs defined using the dynamic software stubbing tool may be referred to as dynamic testing stubs or dynamic stubs.

When an application programming interface request is transmitted by the software unit under test, for example a software component being tested or a software application being tested, the request is received by the tool. The tool searches the data store for a stub that has a stub handle that matches a sub-string of the subject request. If a matching stub is found, the tool returns the matching stub to the software unit under test, and the software unit under test consumes the software stub, e.g., receives and processes the response message provided by the software stub.

In an embodiment, the software stubs defined using the dynamic software stubbing tool may have a state that is one of active or inactive. If the subject stub has not been used recently, the state of the stub may be changed to inactive. By searching only stubs that have an active state, the dynamic software stubbing tool may respond more rapidly to application programming interface requests. By retaining inactive stubs in the data store, the dynamic software stubbing tool promotes the recovery and reuse of selected stubs through a user operation. Additionally, stubs created using the dynamic software stubbing tool may be designated as reserved for private use of the user who created the stub, for group use of any user belonging to the same work group as the user who created the stub, or for public use by anyone having access to the dynamic software stubbing tool.

In an embodiment, the dynamic software stubbing tool is configured to hand off application programming interface requests to a static software stubbing tool for handling when no match to the request is found in the data store. In this case, if the static software stubbing tool finds a matching stub in the statically defined stubs, the static tool returns the statically defined stub to the software under test. In an embodiment, the static software stubbing tool may impose a requirement that application programming interface requests presented to it comply with complicated format and/or protocol criteria. It is contemplated that the dynamic software stubbing tool mediates between the request input by the user and the request presented to the static software stubbing tool by mapping the relatively simple argument list input by the user, for example using a user interface provided by the dynamic software stubbing tool, to the specific format and argument list required by the static software stubbing tool, thereby preserving the user friendliness and convenience of the interface presented to the tester.

Figure 1:
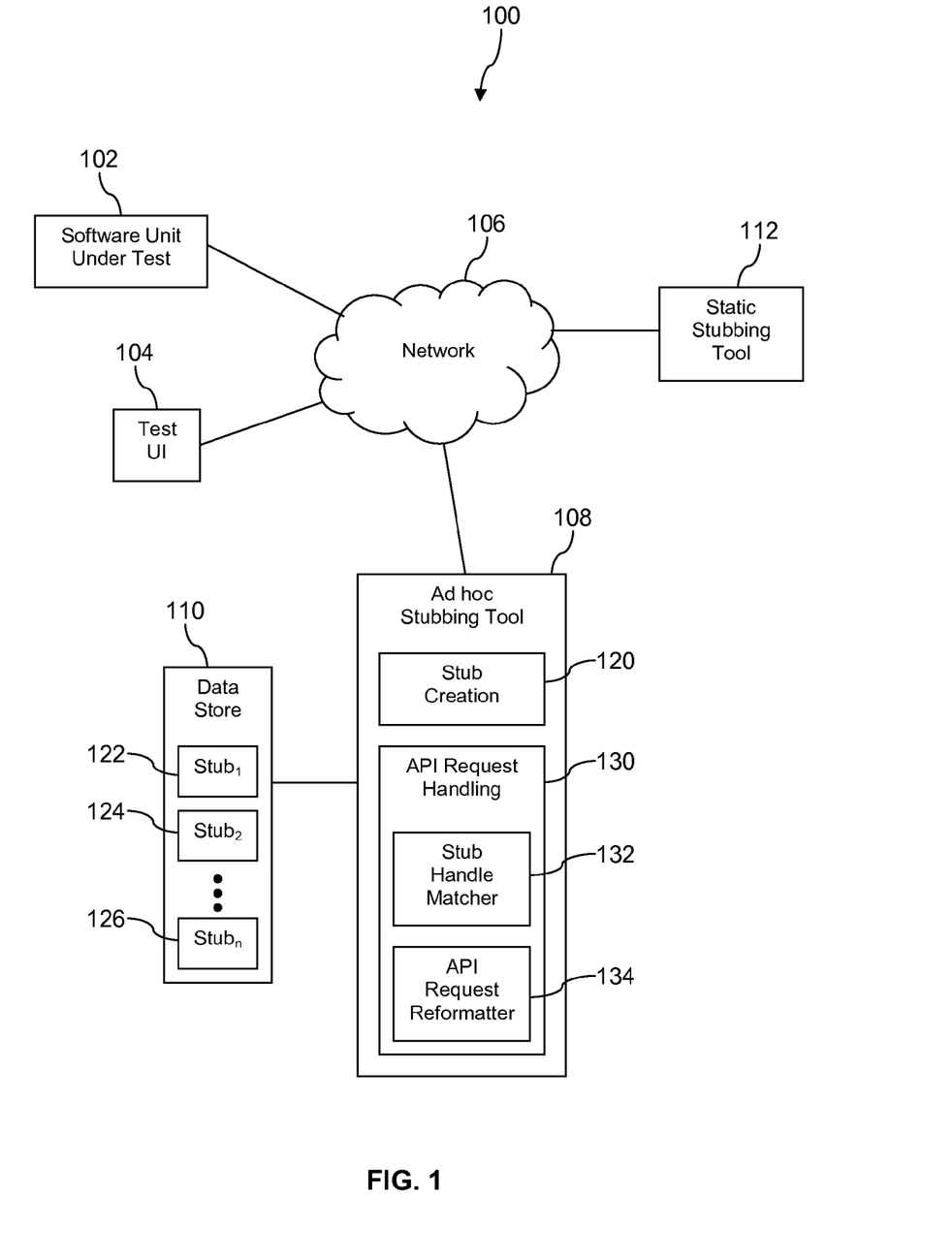
FIG. 1 is an illustration of a software testing system according to an embodiment of the disclosure.

Turning now to FIG. 1, a software testing system 100 is described. In an embodiment, the system 100 comprises a software unit under test 102, a test user interface 104, a communication network 106, an ad hoc stubbing tool 108, a data store 110, and a static stubbing tool 112. The network 106 may comprise any combination of private and public networks. In an embodiment, the system 100 may not comprise the static stubbing tool 112. In some contexts, the ad hoc stubbing tool 108 may be referred to as a dynamic stubbing tool or as a dynamic software stubbing tool. The software unit under test 102, the test user interface 104, the ad hoc stubbing tool 108, the data store 110, and the static stubbing tool 112 may execute on one or more computers. One or more of the software unit under test 102, the test user interface 104, the ad hoc stubbing tool 108, the data store 110, and the static stubbing tool 112 may execute on the same computer. Computers are described in detail hereinafter.

The data store 110 may be implemented in a variety of ways. The data store 110 may be implemented as a database or as a server computer executing database management software coupled to a memory storage peripheral. The data store 110 may be implemented as a directory store, for example a light-weight directory access protocol (LDAP) store. The data store 110 may be implemented in a flat file format or other file format. The data store 110 may be implemented in a different kind of data structure or architecture.

In an embodiment, the test user interface 104 may be used to define test stubs, to bring the software unit under test 102 into execution, and to execute test cases that may involve the software unit under test 102 being exercised and making calls to and/or invoking methods on an application programming interface (API), where the API is simulated or stubbed by the ad hoc stubbing tool 108. In an embodiment, a user may use the test user interface 104 to define test stubs and to execute test cases at nearly the same time, for example, to define a stub and then shortly thereafter, possibly fifteen seconds later, to execute a test case that relies on the recently defined stub. In an embodiment, a user may use the test user interface 104 to perform administrative actions related to testing, for example recording failed test cases in a software defect management tool data base, to perform statistical analysis of various kinds on the results of testing a plurality of test cases, and other like administrative actions that may be involved in testing software.

In some contexts, the newly defined test stub may be said to be immediately available or instantly available for use in testing. For the purposes of the present disclosure, the newly defined test stub may be considered to be immediately available if it can be used for testing in less than five minutes after definition, if it can be used in less than one minute after definition, or if it can be used in less than fifteen seconds after definition. As would be appreciated by one skilled in the art, often a first tool is used to define and store test stubs and a second tool is used to perform testing that interacts with the stored test stubs. In an embodiment of the disclosure, a single execution session of the ad hoc stubbing tool 108 may promote defining a test stub, storing the test stub, executing a test case that results in returning the test stub to the software unit under test. As used herein, a single execution session may comprise the processing performed by the ad hoc stubbing tool 108 from the point that it has completed boot-up and/or initialization to the point at which it is shut down or terminated, for example when one or more processes that provide the processing of the ad hoc stubbing tool 108 are killed or otherwise discontinued.

The software unit under test 102 may be any software application or component or any plurality of software applications or components. The software unit under test 102 may be subjected to testing during various stages of development and/or maintenance of the subject software. The software unit under test 102, during the course of its execution, may send request messages directed to an API of a specific supporting application such as a messaging system or other application. The software unit under test 102 may typically expect a reply to the request message that conforms to a specific reply message format, for example a reply message format defined by the API of the specific supporting application. The inventors believe that the concept of a software test stub or stub is well understood by those of ordinary skill in the art, but generally a stub is understood to provide a modest and limited simulation of the supporting application. The stub may be considered to provide a dummy response message that carries merely plausible content or perhaps fixed and invariable content.

It is contemplated that the system 100 is compatible with testing software units under test 102 that may make calls to a variety of APIs, and the specific examples of APIs described below are not meant to suggest that the system 100 is unsuitable for use with other APIs. During testing, the software unit under test 102 may be configured to send request messages to and to receive reply messages from the ad hoc stubbing tool 108. The ad hoc stubbing tool 108 may be considered to simulate the absent API and/or support application. In response to receiving the request message from the software unit under test 102, the ad hoc stubbing tool 108 may return a reply message to the software unit under test 102 that is consistent with the reply message format of the subject API. The reply message that the ad hoc stubbing tool 108 sends to the software unit under test 102 may be referred to as a test stub or simply a stub. Alternatively, the combination of the request message and the returned reply message may be referred to as a test stub or stub.

The test user interface 104 may present a graphical user interface (GUI) for the user to define stubs. After creation, the stub may be stored in a data store 110 comprising a plurality of stubs, for example a first stub 122, a second stub 124, and a third stub 126. The test user interface 104 may present windows into which the user may enter information for defining the stub, including a unique stub handle that may be used to uniquely identify the subject stub among a plurality of other stubs. The test user interface 104 may present a window in which to select an application programming interface type, for example a message transport API, for example the IBM Message Queue message transport API, or a hypertext markup language transport protocol (HTTP).

The test user interface 104 may present a window for defining a sharing type. For example, the test user interface 104 may promote defining a sharing type and/or a sharing level as one of a private level, a group level, or a public level. If the private level of sharing is selected, the stub may only be accessed and used by the user who defined the subject stub. If the group level of sharing is selected, the stub may be accessed by any user who is a member of the same work group to which the defining user belongs. If the public level of sharing is selected, the stub may be accessed by any user. Work groups may be defined in a configuration file that the ad hoc stubbing tool 108 reads during initiation, e.g., when the ad hoc stubbing tool 108 starts executing.

The test user interface 104 may present buttons to promote the user activating the stub or deactivating the stub. For example, after a predefined time period during which the third stub 126 is not used, the third stub 126 may be marked as having an inactive status. If the user wishes to return the third stub 126 to an active status, the user may display the third stub 126 and select it to active status. The test user interface 104 may promote the user indicating to which application the stub is associated, for example an identity of the software unit under test 102. When defining a new stub, the test user interface 104 may promote creating a stub initially by copying an existing stub and then allowing the user to modify this stub, thereby saving time in creating new stubs. It will be appreciated that the test user interface 104 may present yet other features for creating and defining new stubs 122, 124, 126.

In an embodiment, the ad hoc stubbing tool 108 may comprise a stub creation application 120 and an application programming interface request handling application 130. The API request handling application 130 may comprise a stub handle matching component 132 and an API request reformatter component 134. One skilled in the art will appreciate that the ad hoc stubbing tool 108 may take other forms and/or architectures.

The stub creation application 120 may receive the definition of a stub from the test user interface 104 and process this definition. The stub creation application 120 may search the data store 110 using the stub handle provided in the stub definition. If the stub handle is found associated with another stub 122, 124, 126 in the data store 110, the stub creation application 120 sends an exception message or other error message to the test user interface 104 indicating that the stub handle provided is not unique in the data store 110. If the stub handle is not found in the data store 110, the stub creation application 120 may write the stub definition as a stub into the data store 110. The stub definition may comprise a variety of information in addition to the stub handle.

The API request handling application 130 receives request messages from the software unit under test 102. The API request handling application 130 searches for a stub 122, 124, 126 in the data store 110 that has a stub handle that matches the request message. For example, the stub handle matcher component 132 may analyze stubs 122, 124, 126, one after the other, to determine whether there is a match between the stub handle defined for the stub and a portion of the content of the request message, for example to determine if there is a match between the stub handle and a substring of the request message. When a stub is found whose stub handle matches a substring of the request message, the API request handling application 130 may stop searching in the data store 110 and return the stub as the response message to the software unit under test 102. In an embodiment, the API request handling application 130 may format the content of the selected stub appropriately, for example formatting the content in the format defined by the subject application programming interface, for example according to a message queue reply message format.

In an embodiment, the stub handle matcher 132 and/or the API request handling application 130 may only analyze stubs 122, 124, 126 that have an active status and disregards any stub that has an inactive status, thereby speeding the process of finding a matching stub. Likewise, the stub handle matcher 132 and/or the API request handling application 130 may only analyze stubs 122, 124, 126 that have a public share level, that have a group share level and the user is a member of the subject group, or that have a private share level and the user is the user associated with this stub, thereby speeding up the search process by omitting the substring search using the subject stub handle. In an embodiment, a tester may configure the stub handle matcher 132 to search the data store 110 only among the stubs 122, 124, 126 that are associated with a specific private level (e.g., a specific user) or with a specific work group. This functionality may speed searching for stubs when the user knows which category of stubs 122, 124, 126 their request message is expected to match to.

When a stub match is not found in the data store 110, the API request reformatter 134 may format an API request message based on the content of the request message provided by the software unit under test 102 and send the formatted request message to the static stubbing tool 112. The static stubbing tool 112 may expect to receive additional parameters or request messages formatted in a specialized format that a user may be unknowledgeable about. In an embodiment, the API request reformatter 134 may be considered to provide a kind of mediation role. The static stubbing tool 112 may return a reply message directly to the software unit under test 102. Alternatively, the static stubbing tool 112 may return a reply message to the API request reformatter 134, and the API request reformatter 134 may create a reply message according to a format preferred by the software unit under test 102 based on the content in the reply message provided by the static stubbing tool 112 and send this created reply message to the software unit under test 102. Alternatively, when the static stubbing tool 112 is not part of the system 100, the API request handling component 130 may return an exception reply message or a default response message to the software unit under test 102. In an embodiment, the static stubbing tool 112 may be provided by a vendor or third party and may be referred to in some contexts as a third party application.

Figure 2:
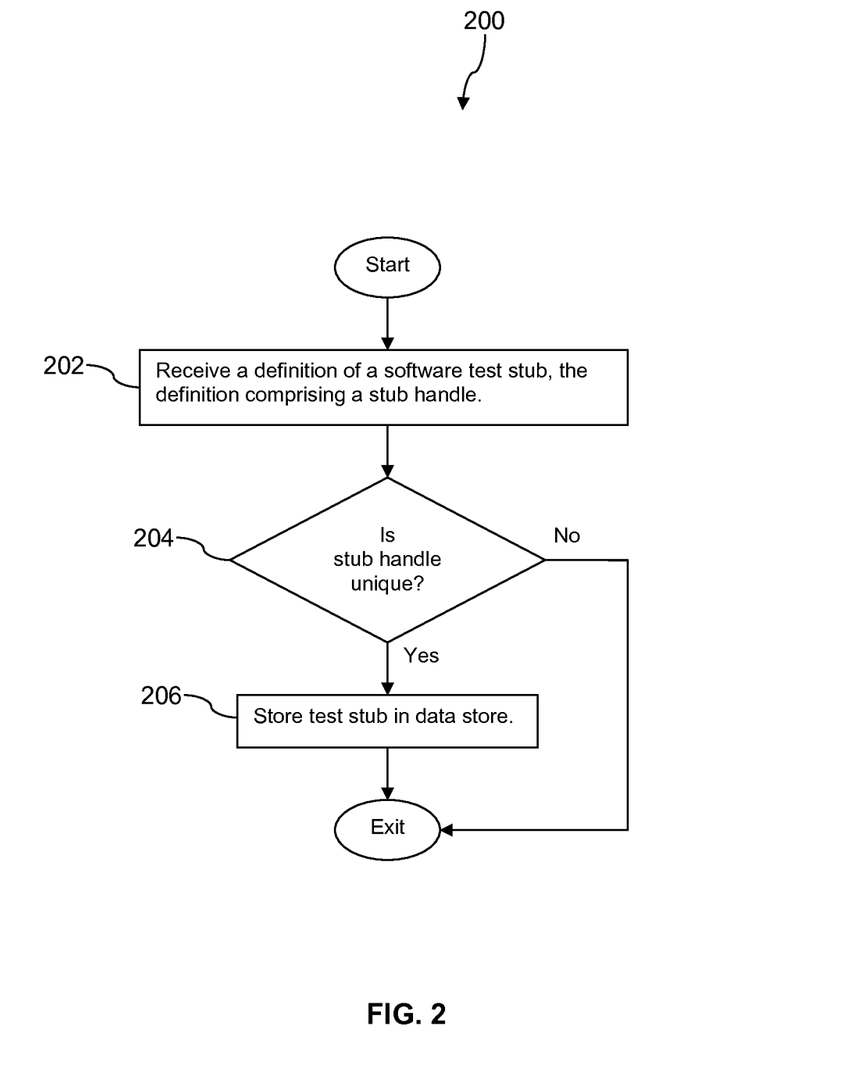
FIG. 2 is a flow chart of a method according to an embodiment of the disclosure.

Turning now to FIG. 2, a method 200 is described. At block 202, a definition of a software test stub is received, the definition comprising a stub handle. A stub handle may comprise a string of characters and/or numbers. The stub handle may be defined by highlighting a portion of a stub definition, for example using the test user interface 104. At block 204, it is determined whether the stub handle is unique in a data store, for example in the data store 110. In an embodiment, the data store 110 may be partitioned according to individual users, groups of users, and all users. A stub that has a private sharing status defined may be stored in a partition of the data store 110 associated only with that particular defining user. Thus, the private partition of a first user may have a stub defined having a stub handle that is identical to a stub defined in in the private partition associated with a second user. The private partition of the first user may not have a stub defined having a stub handle that is identical to a stub handle of a stub defined in the group partition associated with the first user or to a stub handle of a stub defined in the public partition. Alternatively, in an embodiment, every stub handle in the data store 110 may be required to be unique across the entire data store 110, across all private levels and group levels of sharing. If the stub handle is found to be non-unique, according to the optional tests of uniqueness described above, the method exits. In an embodiment, an exception message may be conveyed to the user attempting to define the stub having a non-unique stub handle, identifying the partition that includes a predefined stub using the same stub handle. If the stub handle is determined to be unique as described above, the processing proceeds to block 206 where the defined test stub is stored in the data store, for example in data store 110.

Figure 3:
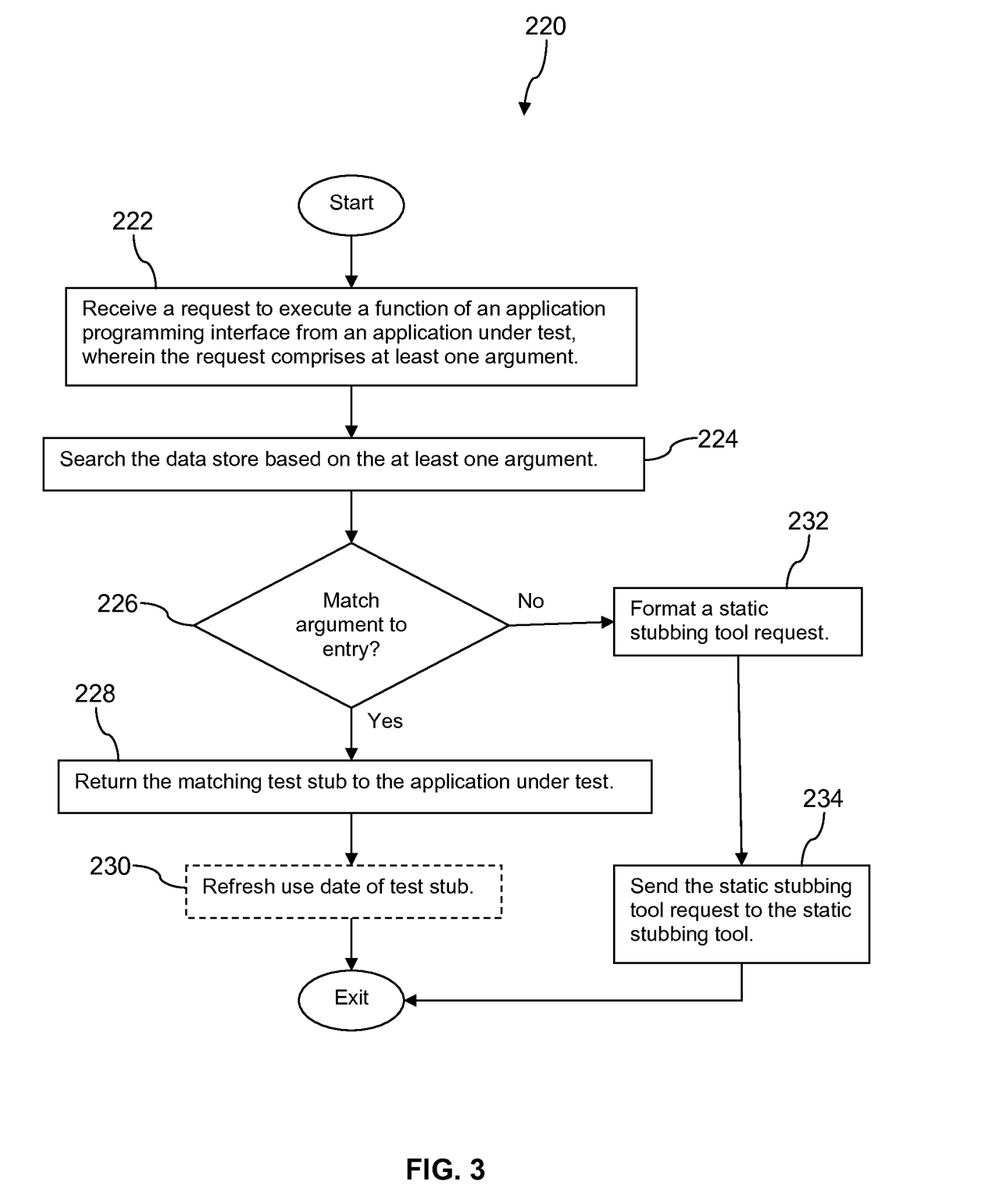
FIG. 3 is a flow chart of a method according to an embodiment of the disclosure.

Turning now to FIG. 3, method 220 is described. At block 222, a request to execute a function or method of an application programming interface is received from an application under test, for example the software unit under test 102, wherein the request comprises at least one argument. At block 224, the data store is searched based on the at least one argument. For example the data store 110 is searched based on the content of the request to see if any stub handle associated with an active stub in the data store 110 matches any substring of the argument list of the method or function call.

The search may check or touch only those stubs in the data store 110 that have a status of active, passing over without analysis those stubs that have an inactive status. In an embodiment, when an active stub has been determined to not have a stub handle that matches a substring of the argument list of the function or method request, a last used date and time field of the subject stub may be compared to the current date and time. If the difference between the last used date and time and the current time exceeds a predefined threshold time interval, the stub may be marked as inactive. In an embodiment, the predefined threshold of time interval may be about one month. In another embodiment, however, a different predefined threshold of time interval may be used, for example about two months, about two weeks, about one week, or some other predefined threshold of time interval. In an embodiment, the search may also pass over with analysis those stubs that are not defined to have the share level that has been configured for the present testing. For example, the tester may have configured the stub handle matcher 132, for example when initializing the ad hoc stubbing tool 108, to only search among stubs 122, 124, 124 having public level share access defined.

At block 226, if there is no match between the argument list and any stub handle of an active stub in the data store, the processing proceeds to block 232. At block 232, the arguments of the request are reformatted in accordance with the expectations of a static stubbing tool, for example the static stubbing tool 112. At block 234, the reformatted request is send to the static stubbing tool 112. In an embodiment, the static stubbing tool 112 responds to the reformatted request and returns a reply message to the application under test.

At block 226, if there is a match between a stub handle of a stub in the data store and a substring of the argument list of the method or function call, the processing proceeds to block 228. At block 228, the matching stub is returned to the application under test, for example to the software unit under test 102. At block 230, optionally a use date associated with the matching stub is refreshed. For example a use date and time field associated with the stub in the data store 110 is updated to reflect the current time and date. It is understood that in an embodiment, the processing of method 200 and of method 220 may be performed during a single execution session of the ad hoc stubbing tool 108.

Figure 4:
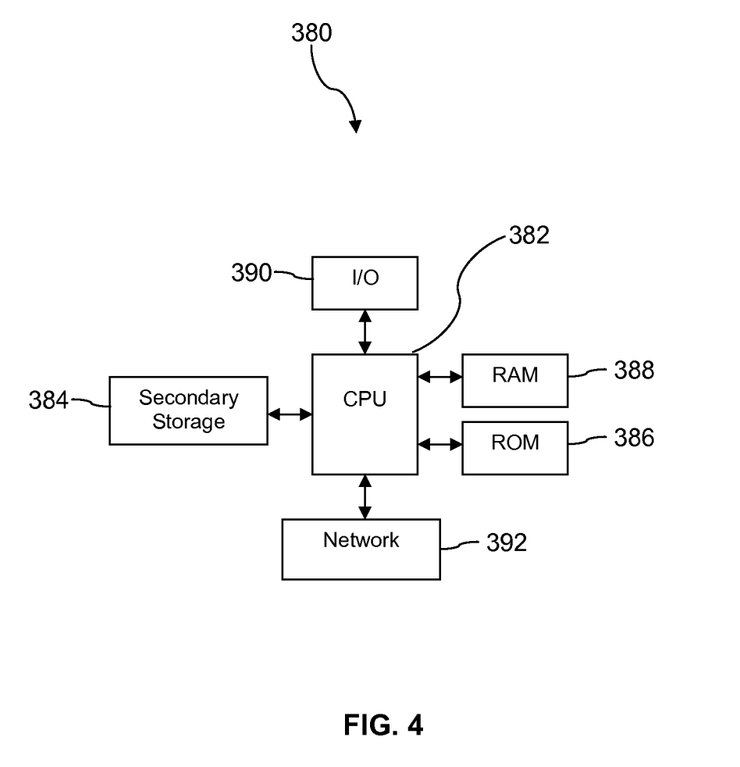
FIG. 4 is an illustration of a computer system according to an embodiment of the disclosure.

FIG. 4 illustrates a computer system 380 suitable for implementing one or more embodiments disclosed herein. For example, the ad hoc stubbing tool 108, the static stubbing tool 112, the data store 110, the test user interface 104, and/or the software unit under test 102 may be implemented by and/or execute on a computer system similar to the computer system 380 described below. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A software testing tool providing dynamic testing stubs, comprising:
    a processor;
    a non-transitory memory coupled to the processor; and
    an application stored in the memory that, when executed by the processor in a single execution session,
        receives a definition of a test stub as a mapping from a stub handle to a reply message content,
        stores the test stub in a data store as an entry comprising the stub handle and the reply message content,
        receives a request message comprising an invocation of an application programming interface from an application under test, where the invocation comprises an argument,
        searches the data store for any test stub having a stub handle that matches at least in part to the argument received in the invocation of the application programming interface,
        transmits a reply message defined by the test stub to return the test stub to the application under test when the search of the data store accesses the test stub with the stub handle that matches at least in part to the argument received in the invocation of the application program interface,
        marks the test stub as having an inactive status when the test stub has not been accessed for a predefined interval of time,
        formats the request message to produce a formatted request message based in part on the request message and other information not present in the request message when the search of the data store does not access any test stubs that have a stub handle that matches a sub-string of the request message, and
        transmits the formatted request message to a static software stubbing application,
        wherein each entry in the data store comprises a status, and wherein the application analyzes only entries that have an active status to determine whether there is a substring match between at least one stub handle associated with any test stubs and the argument.

2. The tool of claim 1, wherein searching the data store using the stub handle comprises the application analyzing entries in the data store to determine a match between the stub handle of test stubs and a substring within the argument received in the invocation of the application programming interface.

3. The tool of claim 1, wherein the application, prior to storing the test stub in the data store, searches the data store based on the stub handle to assure that the stub handle is unique.

4. The tool of claim 1, wherein the definition of the test stub comprises an identification of one of a plurality of different application programming interfaces and wherein the test stub is further stored as an entry in the data store that comprises the identification of the application programming interface.

5. A method of software testing, comprising:
    receiving a definition of a software test stub, the definition comprising a stub handle;
    storing the software test stub in a data store;
    receiving a request message to execute a function of an application programming interface (API) from an application under test, wherein the request message comprises at least one argument;
    searching the data store based on the at least one argument;
    when the at least one argument matches the stub handle associated with the software test stub, returning the software test stub to the application under test by transmitting a reply message defined by the test stub, wherein the receiving, the storing, and the returning are performed during a single execution session of a software testing tool;

marking the software test stub as having an inactive status when the software test stub has not been accessed for a predefined interval of time;

formatting the request message to produce a formatted request message based in part on the request message and other information not present in the request message when the search of the data store does not access any software test stubs that have a stub handle that matches a sub-string of the request message; and transmitting the formatted request message to a static software stubbing application, wherein each entry in the data store comprises a status, and wherein only entries that have an active status are analyzed to determine whether there is a substring match between at least one stub handle associated with any software test stubs and the at least one argument.

6. The method of claim 5, wherein the definition of the software test stub further comprises a reply message that corresponds to a reply message format of the application programming interface.

7. The method of claim 5, wherein the application programming interface is one of a message queue manager application programming interface and a hypertext markup language (HTML) application programming interface.

8. The method of claim 5, further comprising determining that the stub handle is unique within the data store before storing the software test stub in the data store.

9. The method of claim 5, further comprising:
receiving a definition of a second software test stub, the definition comprising a second stub handle;

determining that the second stub handle is not unique within the data store; and based on determining that the second stub handle is not unique within the data store, sending an exception message indicating the definition of the second software test stub contains a non-unique stub handle, wherein the second software test stub is not stored in the data store.

10. The method of claim 5, wherein the static software stubbing application is a third party application.

11. The method of claim 5, wherein the searching the data store comprises analyzing the content of each of the entries in the data store that have the active status to compare a stub handle defined in a corresponding entry in the data store to the request message.

12. The method of claim 11, wherein when analyzing the corresponding entry in the data store that has the active status, if the corresponding entry in the data store has not been used for at least the predefined interval of time, marking the corresponding entry to have the inactive status.

13. The method of claim 5, further comprising:
receiving a test stub reactivation message comprising a second stub handle;

searching the data store for an entry having the inactive status based on the second stub handle; and when the entry having the inactive status and having the second stub handle is found, changing the inactive status of the entry to the active status.

* * * * *